Feb. 10, 1953 S. S. SZELWACH 2,627,779
RANGE FINDER
Filed April 21, 1949

INVENTOR.
STANLEY S. SZELWACH
BY
ATTORNEY.

Patented Feb. 10, 1953

2,627,779

UNITED STATES PATENT OFFICE 2,627,779

RANGE FINDER

Stanley S. Szelwach, Jackson Heights, N. Y., assignor to Q-O-S Corporation, New York, N. Y., a corporation of New York Application April 21, 1949, Serial No. 88,777

3 Claims. (Cl. 88—2.4)

This invention relates to range finders used in conjunction with the precise focusing of cameras, and, more particularly, to range finders which are used separately and apart from the camera and which give the distance to a particular object (which distance may then be used in focusing the camera or for any other purpose.) The range finders to which this invention pertains are small and for this reason are generally referred to as pocket range finders.

The principal objects of this invention are to provide a pocket range finder which is simple in construction, relatively inexpensive, small and compact in size, sturdy and reliable in operation and easy to manipulate. Among the other objects of invention are structural arrangements of parts which will be described in the ensuing specification and set forth in the appended claims.

For the attainment of the foregoing and such other objects of invention as may appear or be pointed out herein, I have shown a preferred embodiment of my invention in the accompanying drawing, wherein.

Figure 1:
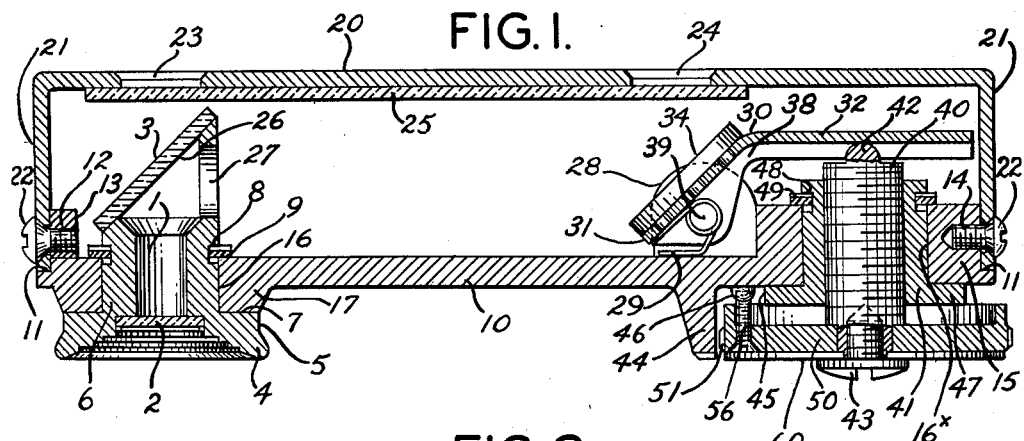
Fig. 1 is a sectional elevation along the longitudinal axis of the improved range finder.

The improved range finder comprises a base 10 which is generally rectangular in outline but irregular in section, Fig. 1, and a shallow cover 20 closed by the base 10. To receive the cover in this closing relationship, the base 10 is recessed to provide a peripheral ledge 11 on which seat the end walls 21 of the cover, Fig. 1, and also the side walls (not shown). The width of recessed ledge 11 is substantially equal to the wall thickness of cover 20 so that a flush surface is presented, as best seen in Fig. 1. Cover 20 is removably held in place by a pair of screws 22 which clear through apertures in the end walls 21 of the cover to be threaded in tapped holes 12, 14. Tapped hole 12 opens through an upstanding lug 13 provided at the left end of base 10. Tapped hole 14 is disposed in a thickened portion 15 provided at the right end of the base.

Cover 20 is pierced by a pair of openings 23, 24 spaced a predetermined distance apart. Secured to the inner side of cover 20 is a length of glass 25 which serves to close the interior of the device against dust. Opposite light opening 23 is a half-silvered mirror 3, while opposite light opening 24 is an ordinary mirror or reflecting surface 34. Half-silvered mirror 3 is secured to a tubular eye-piece 6 which is received in a round opening 16 in base 10. A piece of glass 2 closes the inner bore 1 of eye piece 6. Rays entering the range finder at opening 23 pass directly through the half-silvered glass 3 to inner bore 1 of the eye-piece. Rays entering the range finder at the other opening 24 are reflected by mirror 34 to the inner surface of half-silvered glass 3 where they are again reflected to enter inner bore 1 of the eye-piece.

In the operation of the range finder, half-silvered mirror 3 is fixed whereas mirror 34 is angularly adjusted (in a manner fully described subsequently) in determining the range or distance of an object whose images enter spaced openings 23, 24.

Tubular eye-piece 6 has an annular shoulder 7 formed at the juncture of the eye flange 4 and the reduced cylindrical portion of the eye-piece. The eye-piece is inserted through opening 16 with shoulder 7 abutting an annular boss 17 provided on the outer surface of base 10. The eye-piece is held in position by a bowed split-ring spring 9 which is received in an annular groove 8 in the outer surface of tubular eye-piece 6. Annular groove 8 is disposed relatively to the base 10 so that one wall of annular groove 8 is somewhat below the inner surface of base 10. Bowed split-ring spring 9 is disposed in said annular groove 8 so that it is in contact with both the upper surface of the groove and with said inner surface of base 10.

Figure 3:
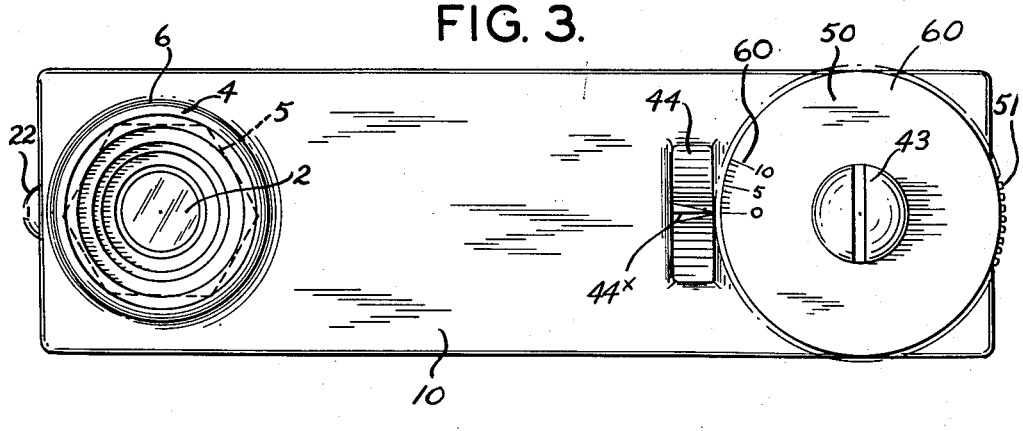
Fig. 3 is a bottom view of the device.

The compressive force urging the ends of split-ring 9 into closed relation is sufficiently high to impose a frictional drag on the eye-piece 6 preventing the eye-piece from being turned by gripping the annular eye flange 4. However, it is necessary at the factory and often in the field to angularly adjust the position of the eye-piece, or rather, the half-silvered mirror 3 secured thereto, relative to the other mirror 34. For this purpose, a hexagonal surface 5, see also Fig. 3, is provided externally of the tubular eye-piece between annular eye flange 4 and boss 17 of the base. By means of a special spanner wrench supplied with the range finder, eye-piece 6 may be turned against the frictional drag of split-ring spring 9, to adjust half-silvered mirror 3 relative to reflecting mirror 34.

Tubular eye-piece 6 is cut substantially 45° to provide an inclined annular surface 26 on which half-silvered mirror 3 is seated and cemented. An opening 27 is pierced through the wall of the tubular eye-piece to admit rays from the other mirror 34.

Figure 2:
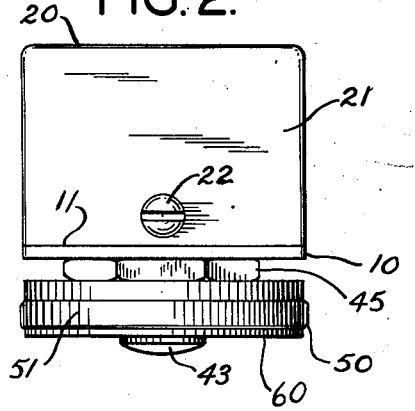
Fig. 2 is an end view of the device taken from the right of Fig. 1.

Reflecting mirror 34 is secured to the inclined leg 31 of a lever 30 which also has a substantially horizontal leg 32. Lever 30 also has a depending flange 38 by which it is pivotly mounted at 39 to an upstanding lug 28 on the base 10. A wire spring 29 coiled about pivot 39 of the lever 30 with one end engaging the base 10 and the other end engaging the lever 30, tends to turn the lever in a clockwise sense, i. e., to depress horizontal leg 32 of the lever. This spring-urged depressing of leg 32 is resisted by the abutment of horizontal leg 32 with a button 42 projecting from upper end of a screw bolt 40 which is threadedly received in an internally threaded bushing 41. Bushing 41 is secured to base 10 in a manner similar to that previously described with reference to the eye-piece 6. That is, base 10 has a round opening 16$^x$ at the thickened portion 15 of the base, through which the bushing 41 passes, with a flange 47 at the lower end of the bushing abutting the base 10. Bushing 41 is retained in place by a bowed split-ring spring 49 which is received in an annular groove 48 of bushing 41 to firmly hold the bushing against turning (in the manner described above with reference to bowed split-ring 9 of eye-piece 6). However, flange 47 of the bushing has a hexagonal surface 45, see Fig. 2, which is adapted to receive a spanner wrench whereby the bushing may be turned against the resistance of spring 49 for adjustment at the factory or in the field. (Conveniently hexagonal surfaces 5 and 45 may be made to common dimension to receive the same spanner wrench.)

A small disc 50 is secured to the lower end of screw bolt 40. Disc 50 is knurled around its peripheral rim 51 to facilitate turning of the disc by the fingers. A calibrated plate 60 is secured to the underside of disc 50, as by means of the screw 43; the calibration marks being read with reference to a reference mark 44$^x$ which is provided on a lug 44 which depends from base 10 to position the tip of the lug substantially flush with the calibrated plate 60. A lug 46 depending from the underside of base 10 serves as a stop in cooperation with a small screw 56 in the disc 50, see Fig. 1, to halt the counter-clockwise turning of disc 50, as viewed in Fig. 3, with the zero mark of the disc calibrations (60) opposite reference mark 44$^x$ (as shown in Fig. 3).

It will be observed that the range finder construction as described above may simply and easily be precisely adjusted for exact image superimposition, either in the factory or in the field, while sighted on an object through the eyepiece with all adjustments effected from outside the casing. This may be accomplished in the following manner: the mirror 34, being solidly affixed to the inclined leg 31 of the lever 30, may be adjusted to an object being sighted by turning disk 50 to move the lever until the image coincides along one axis or dimension with the image obtained in the eye-piece through plate 3; while still sighting the object the spanner wrench may be applied to the flattened portions 5 of the eye-piece, exterior of the base 10, and the eye-piece rotated to exactly superimpose the image along the other axis or dimension normal to the first-named axis, this adjustment insuring that subsequent images obtained in the eye-piece can be exactly superimposed in two dimensions by rotation of the eyepiece, the plate 3 has been brought into exact parallelism with mirror 34, in spite of the manufacturing tolerances and errors incident to fabrication of the lever, its pivot, and the securement of the mirror 34 which tend to prevent absolute parallelism between parts 34 and 3. Thereafter, the range finder may be precisely indexed, either in the factory or in the field, while sighting an object and from the exterior of the casing, so as to permit accurate findings of distance to objects sighted in normal use of the finder. The indexing is performed in the following manner: the screw 43 is first loosened and the range finder is then sighted on an object at considerable distance (over 300 feet, i. e. approaching infinity); the disk 50 is then turned so that screw 56 abuts the stop 46 and the disk is held in this abutting relation by the fingers of one hand while the spanner wrench is applied to the flange 47 to rotate the bushing 41, disk 50 and screw 40 being held from rotation in the manner stated, until the image obtained in the eye-piece from mirror 34 is superimposed exactly on that obtained through the plate 3, the coincidence of the image resulting from axial movement without rotation of screw 40, caused by turning of the bushing 41; at this point the calibrated disk is turned so that the index line for infinity is aligned with the marking 44$^x$, without moving disk 50 or screw 56 out of abutment with stop 46, and the screw 43 is tightened to fixedly position the calibrated disk 60 with respect to disk 50 and screw 40. Thereafter the knurled disk 50 of the range finder is free to make one complete revolution before screw 56 again abuts stop 46, during normal range finding operation, and the mirror 34 and its supporting lever is precisely indexed with respect to the calibrations on dial 60 so as to render accurate readings of the distance from the range finder to any object sighted upon.

I claim:

1. In a pocket range finder having an elongated casing provided with a pair of spaced light receiving apertures in one wall thereof and a mirror angularly disposed within said casing pivotally supported for turning adjustment to reflect light received through one of said apertures lengthwise of the casing interior and a third aperture in the wall of said casing opposite to said first mentioned wall and in alignment with said other aperture; a tubular eye-piece rotatably mounted in said third aperture, resilient means securing the eye-piece to the wall of said casing surrounding said third aperture with a frictional force normally preventing rotation until the friction is overcome by a greater force applied to the eye-piece externally of the casing, a half silvered plate fixedly secured to the inner end of said eyepiece at an angle to the axis thereof and extending across its bore between said aligned apertures and positioned to receive the light reflected by said mirror and to reflect it through said eye-piece in addition to permitting the direct passage of light from said other aperture through the bore of said eye-piece whereby said plate is rotatable with said eyepiece about an axis normal to the pivot axis of said mirror, and the half silvered plate, while the range finder is sighted on an object and adjusted for coincidence in a dimension by means of said mirror, may be adjusted to coincidence in a dimension normal to said first dimension by the rotation of said eyepiece.

2. In a pocket range finder having an elongated casing provided with a pair of spaced light receiving apertures in one wall thereof and a mirror angularly disposed within said casing pivotally supported for turning adjustment to reflect light received through one of said apertures lengthwise of the casing interior and a third aperture in the wall of said casing opposite to said first mentioned wall and in alignment with said other aperture; a tubular eye-piece rotatably mounted in said third aperture, resilient means securing the eyepiece to the wall of said casing surrounding said third aperture with a frictional force normally preventing rotation until the friction is overcome by a greater force applied to the eye-piece externally of the casing, a half silvered plate fixedly secured to the inner end of said eye-piece at an angle to the axis thereof and extending across its bore between said aligned apertures and positioned to receive the light reflected by said mirror and to reflect it through said eyepiece in addition to permitting the direct passage of light from said other aperture through the bore of said eye-piece, said eye-piece being of tubular cylindrical form and being provided with a beveled inner end to which said half silvered plate is secured the cylindrical wall of said eye-piece near said beveled end being provided with an opening for passage of image light rays from said mirror to the inner surface of said plate, whereby said plate is rotatable with said eye-piece about an axis normal to the pivot axis of said mirror, and the half silvered plate, while the range finder is sighted on an object and adjusted for coincidence of images in a first dimension by means of said mirror, may be adjusted to coincidence of images in the dimension normal to said first dimension by the rotation of said eye-piece.

3. In a pocket range finder having an elongated casing provided with a pair of spaced light receiving apertures in one wall thereof and a mirror angularly disposed within said casing pivotally supported for turning adjustment to reflect light received through one of said apertures lengthwise of the casing interior and a third aperture in the wall of said casing opposite to said first mentioned wall and in alignment with said other aperture; a tubular eye-piece rotatably mounted in said third aperture, a flange formed at one end of said eye-piece for rotatably abutting an exterior surface of the casing and an annular recess spaced inwardly of said flange, resilient means securing the eye-piece to the wall of said casing surrounding said third aperture with a frictional force normally preventing rotation until the friction is overcome by a greater force applied to the eyepiece externally of the casing said resilient means comprising a split resilient ring seated in said recess and engaging the inner surface of the casing, a half silvered plate fixedly secured to the inner end of said eye-piece, said eye-piece being of tubular cylindrical form and being provided with a beveled inner end to which said half silvered plate is secured, the cylindrical wall of said eye-piece near said beveled end being provided with an opening for passage of image light rays from said mirror to the inner surface of said plate, said plate being thus secured to the inner end of the eye-piece at an angle to the axis thereof and extending across its bore between said aligned apertures and positioned to receive the light reflected by said mirror and to reflect it through said eye-piece in addition to permitting the direct passage of light from said other aperture through the bore of said eye-piece, whereby said plate is rotatable with said eye-piece about an axis normal to the pivot axis of said mirror, and the half silvered plate, while the range finder is sighted on an object and adjusted for coincidence of images in a first dimension by means of said mirror, may be adjusted to coincidence of images in the dimension normal to said first dimension by the rotation of said eyepiece.

STANLEY S. SZELWACH.

REFERENCES CITED

The following references are of record in the file of this patent:

UNITED STATES PATENTS

| Number | Name | Date |
|---|---|---|
| 2,058,484 | Mihalyi | Oct. 27, 1936 |
| 2,186,806 | Liebmann | Jan. 9, 1940 |
| 2,284,831 | McCanlies | June 2, 1942 |

FOREIGN PATENTS

| Number | Country | Date |
|---|---|---|
| 606,777 | Great Britain | Aug. 19, 1948 |